(12) United States Patent
Kuran et al.

(10) Patent No.: US 10,950,356 B2
(45) Date of Patent: *Mar. 16, 2021

(54) NUCLEAR FUEL CONTAINING RECYCLED AND DEPLETED URANIUM, AND NUCLEAR FUEL BUNDLE AND NUCLEAR REACTOR COMPRISING SAME

(75) Inventors: Sermet Kuran, Mississauga (CA); Mustapha Boubcher, Burlington (CA); Cathy Cottrell, Ancaster (CA)

(73) Assignee: ATOMIC ENERGY OF CANADA LIMITED, Chalk River (CA)

( * ) Notice: Subject to any disclaimer, the term of this patent is extended or adjusted under 35 U.S.C. 154(b) by 625 days.

This patent is subject to a terminal disclaimer.

(21) Appl. No.: 13/885,579

(22) PCT Filed: Nov. 15, 2010

(86) PCT No.: PCT/IB2010/002915
§ 371 (c)(1),
(2), (4) Date: Jun. 20, 2013

(87) PCT Pub. No.: WO2012/066368
PCT Pub. Date: May 24, 2012

(65) Prior Publication Data
US 2013/0266112 A1    Oct. 10, 2013

(51) Int. Cl.
| | | |
|---|---|---|
| *G21C 3/58* | (2006.01) | |
| *G21C 3/42* | (2006.01) | |
| *G21C 1/20* | (2006.01) | |
| *G21C 3/326* | (2006.01) | |
| *G21C 3/60* | (2006.01) | |
| *G21C 3/62* | (2006.01) | |

(52) U.S. Cl.
CPC .............. *G21C 3/42* (2013.01); *G21C 3/58* (2013.01); *G21C 1/20* (2013.01); *G21C 3/326* (2013.01); *G21C 3/60* (2013.01); *G21C 3/62* (2013.01); *Y02E 30/30* (2013.01)

(58) Field of Classification Search
CPC ... G21C 3/42; G21C 1/20; G21C 3/58; G21C 3/60; G21C 3/62
USPC ........................................ 376/901, 409, 419
See application file for complete search history.

(56) References Cited

U.S. PATENT DOCUMENTS

| | | | |
|---|---|---|---|
| 2,900,263 | A | 8/1959 | Handwerk et al. |
| 2,904,429 | A | 9/1959 | Schonfeld |
| 2,938,784 | A | 5/1960 | Spedding et al. |
| 3,007,769 | A | 11/1961 | McCord et al. |
| 3,031,389 | A | 4/1962 | Goeddel |
| 3,035,895 | A | 5/1962 | McCorkle |
| 3,041,260 | A | 6/1962 | Goeddel |
| 3,042,598 | A | 7/1962 | Crowther |
| 3,087,877 | A | 4/1963 | Goeddel |
| 3,103,479 | A | 9/1963 | Ransohoff |
| 3,104,219 | A | 9/1963 | Sulzer |
| 3,117,372 | A | 1/1964 | McNees et al. |
| 3,147,191 | A | 9/1964 | Crowther |
| 3,168,479 | A | 2/1965 | St. Pierre |
| 3,185,652 | A | 5/1965 | Kleber et al. |
| 3,197,376 | A | 7/1965 | Balent et al. |
| 3,208,912 | A | 9/1965 | Jaye et al. |
| 3,280,329 | A | 10/1966 | Harmer et al. |
| 3,291,869 | A | 12/1966 | St. Pierre |
| 3,293,135 | A | 12/1966 | Jaye et al. |
| 3,300,848 | A | 1/1967 | Leitten, Jr. et al. |
| 3,309,277 | A | 3/1967 | Jaye et al. |
| 3,354,044 | A | 11/1967 | Robertson |
| 3,374,178 | A | 3/1968 | May et al. |
| 3,446,703 | A | 5/1969 | Lyons et al. |
| 3,462,371 | A | 8/1969 | Robertson |
| 3,504,058 | A | 3/1970 | Masselor |
| 3,510,545 | A | 5/1970 | Nishiyama et al. |
| 3,660,228 | A | 5/1972 | Magladry |
| 3,671,453 | A | 6/1972 | Triggiani et al. |
| 3,712,852 | A | 1/1973 | Fisher |
| 3,745,069 | A | 7/1973 | Sofer et al. |
| 3,790,440 | A | 2/1974 | Keshishian |
| 3,799,839 | A | 3/1974 | Fischer et al. |
| 3,806,565 | A | 4/1974 | Langrod |

(Continued)

FOREIGN PATENT DOCUMENTS

| | | |
|---|---|---|
| BE | 781976 | 7/1972 |
| CA | 2097412 | 12/1994 |

(Continued)

OTHER PUBLICATIONS

Prospects for Future CANDU Fuel Cycles, S. R. Hatcher (1979).*
Boczar, et al., "Recycling in CANDU of Uranium and/or Plutonium from Spent LWR fuel."*
"Reactivity Effect Due to Temperature Changes anf Coolant Voiding." from https://canteach.candu.org/Pages/Welcome.aspx.*
"Introduction to Nuclear Kinetics," Chapter 12.*
Leung, "Thermalhydraulics studies examining the feasibility for introducing slightly enriched uranium fuel into the Embalse CANDU reactor", Nuclear Engineering and Design 237 (2007) 1628-1638. (Year: 2007).*

(Continued)

*Primary Examiner* — Jack W Keith
*Assistant Examiner* — Daniel Wasil
(74) *Attorney, Agent, or Firm* — Norton Rose Fulbright Canada LLP

(57) ABSTRACT

Nuclear fuels for nuclear reactors are described, and include nuclear fuels having a first fuel component of recycled uranium, and a second fuel component of depleted uranium blended with the first fuel component, wherein the blended first and second fuel components have a fissile content of less than 1.2 wt % of $^{235}U$. Also described are nuclear fuels having a first fuel component of recycled uranium, and a second fuel component of natural uranium blended with the first fuel component, wherein the blended first and second fuel components have a fissile content of less than 1.2 wt % of $^{235}U$.

23 Claims, No Drawings

(56) References Cited

U.S. PATENT DOCUMENTS

| | | | |
|---|---|---|---|
| 3,838,184 A | 9/1974 | Gyarmati et al. |
| 3,887,486 A | 6/1975 | Googin et al. |
| 3,960,655 A | 6/1976 | Bohanan et al. |
| 3,988,397 A | 10/1976 | Hackstein et al. |
| 3,991,154 A | 11/1976 | Zimmer et al. |
| 3,992,258 A | 11/1976 | Tobin |
| 3,992,494 A | 11/1976 | Holden |
| 4,018,697 A | 4/1977 | Smith |
| 4,020,131 A | 4/1977 | Feraday |
| 4,022,662 A | 5/1977 | Gordon et al. |
| 4,029,545 A | 6/1977 | Gordon et al. |
| 4,032,400 A | 6/1977 | Johnson et al. |
| 4,045,288 A | 8/1977 | Armijo |
| 4,110,159 A | 8/1978 | Lee |
| 4,119,563 A | 10/1978 | Kadner et al. |
| 4,182,652 A | 1/1980 | Puechl |
| 4,200,492 A | 4/1980 | Armijo et al. |
| 4,202,793 A | 5/1980 | Bezzi et al. |
| 4,229,260 A | 10/1980 | Johnson et al. |
| 4,234,385 A | 11/1980 | Ogiya et al. |
| 4,251,321 A | 2/1981 | Crowther |
| 4,261,935 A | 4/1981 | Gutierrez et al. |
| 4,264,540 A | 4/1981 | Butler |
| 4,267,019 A | 5/1981 | Kaae et al. |
| 4,273,613 A | 6/1981 | Radkowsky |
| 4,331,618 A | 5/1982 | Hoyt |
| 4,344,912 A | 8/1982 | Rampolla |
| 4,362,691 A | 12/1982 | Lang et al. |
| 4,381,281 A | 4/1983 | Lang et al. |
| 4,382,885 A | 5/1983 | Haas |
| 4,393,510 A | 7/1983 | Lang et al. |
| 4,406,012 A | 9/1983 | Gordon et al. |
| 4,493,809 A | 1/1985 | Simnad |
| 4,606,880 A | 8/1986 | Penkrot |
| 4,637,915 A | 1/1987 | Camden, Jr. et al. |
| 4,652,416 A | 3/1987 | Millot |
| 4,695,425 A | 9/1987 | Aoyama et al. |
| 4,701,296 A | 10/1987 | Millot et al. |
| 4,942,016 A | 7/1990 | Marlowe et al. |
| 4,968,479 A | 11/1990 | Ogiya et al. |
| 4,992,225 A | 2/1991 | Van Diemen et al. |
| 4,997,596 A | 3/1991 | Proebstle et al. |
| 5,024,809 A | 6/1991 | Taylor |
| 5,037,606 A | 8/1991 | DeVelasco et al. |
| 5,068,082 A | 11/1991 | Ueda et al. |
| 5,089,210 A * | 2/1992 | Reese .................... G21C 3/326 |
| | | | 376/212 |
| 5,136,619 A | 8/1992 | Capossela et al. |
| 5,180,527 A | 1/1993 | Hirai et al. |
| 5,202,085 A | 4/1993 | Aoyama et al. |
| 5,255,299 A | 10/1993 | Hirai et al. |
| 5,337,337 A | 8/1994 | Aoyama et al. |
| 5,349,618 A | 9/1994 | Greenspan |
| 5,377,247 A | 12/1994 | Yoshioka et al. |
| 5,388,132 A | 2/1995 | Aoyama et al. |
| 5,410,580 A | 4/1995 | Seino |
| 5,429,775 A | 7/1995 | Hirai et al. |
| 5,544,211 A | 8/1996 | Haikawa et al. |
| 5,737,375 A | 4/1998 | Radkowsky |
| 5,768,332 A | 6/1998 | Van Swam |
| 5,812,621 A | 9/1998 | Takeda et al. |
| 5,852,645 A | 12/1998 | Romary et al. |
| 5,864,593 A | 1/1999 | Radkowsky |
| 5,940,461 A | 8/1999 | Takeda et al. |
| 5,949,837 A | 9/1999 | Radkowsky |
| 6,005,905 A | 12/1999 | Yamanaka et al. |
| 6,026,136 A | 2/2000 | Radkowsky |
| 6,033,636 A | 3/2000 | Todokoro et al. |
| 6,226,340 B1 | 5/2001 | Anderson |
| 6,251,310 B1 | 6/2001 | Song et al. |
| 6,327,324 B2 | 12/2001 | Nylund |
| 6,512,805 B1 | 1/2003 | Takeda et al. |
| 6,925,138 B2 | 8/2005 | Nakamaru et al. |
| 7,172,741 B2 | 2/2007 | Kawamura et al. |
| 7,295,646 B1 | 11/2007 | Wilbuer et al. |
| 7,349,518 B2 | 3/2008 | Takeda et al. |
| 2002/0118789 A1 | 8/2002 | McCartney |
| 2004/0052326 A1 | 3/2004 | Blanpain et al. |
| 2005/0069074 A1 | 3/2005 | Li et al. |
| 2006/0171498 A1 | 8/2006 | D'Auvergne |
| 2007/0064861 A1 | 3/2007 | Sterbentz |
| 2007/0195919 A1 | 8/2007 | Bouffier |
| 2007/0242791 A1 | 10/2007 | Dubois et al. |
| 2008/0123797 A1 | 5/2008 | Hyde et al. |
| 2008/0144762 A1 * | 6/2008 | Holden .................... G21C 3/62 |
| | | | 376/416 |
| 2008/0219904 A1 | 9/2008 | Gregson et al. |
| 2008/0226012 A1 | 9/2008 | Tsiklauri et al. |
| 2009/0175402 A1 | 7/2009 | Hyde et al. |
| 2009/0252278 A1 | 10/2009 | Bashkirtsev et al. |
| 2009/0268861 A1 | 10/2009 | Shayer |
| 2009/0269261 A1 | 10/2009 | Kim et al. |
| 2009/0323881 A1 | 12/2009 | Dauvergne |
| 2010/0034336 A1 | 2/2010 | Takeda et al. |
| 2013/0202076 A1 * | 8/2013 | Boubcher .................... G21C 3/58 |
| | | | 376/435 |

FOREIGN PATENT DOCUMENTS

| | | |
|---|---|---|
| CA | 2174983 | 10/1997 |
| CA | 2708902 | 6/2011 |
| CN | 1171164 | 1/1998 |
| CN | 1781588 A | 6/2006 |
| CN | 2299593 | 11/2016 |
| EP | 55371 | 7/1982 |
| EP | 977206 | 2/2000 |
| GB | 903412 | 9/1962 |
| JP | 58142293 | 8/1983 |
| JP | 59120987 | 7/1984 |
| JP | 60085390 | 5/1985 |
| JP | 61038491 | 2/1986 |
| JP | 62000898 | 1/1987 |
| JP | 62032385 | 2/1987 |
| JP | 62052492 | 3/1987 |
| JP | 62194497 | 8/1987 |
| JP | 63083689 | 4/1988 |
| JP | 63204193 | 8/1988 |
| JP | 63269093 | 11/1988 |
| JP | 1153996 | 6/1989 |
| JP | 1178893 | 7/1989 |
| JP | 1193692 | 8/1989 |
| JP | 127779 | 11/1989 |
| JP | 1277798 | 11/1989 |
| JP | 3140896 | 6/1991 |
| JP | 11174179 | 7/1991 |
| JP | 3206995 | 9/1991 |
| JP | 4128688 | 4/1992 |
| JP | 6075077 | 3/1994 |
| JP | 7113887 | 5/1995 |
| JP | 7251031 | 10/1995 |
| JP | 11287881 | 10/1999 |
| JP | 11287890 | 10/1999 |
| JP | 2000056075 | 2/2000 |
| JP | 2000193773 | 7/2000 |
| JP | 2002062391 | 2/2002 |
| JP | 2004109085 | 4/2004 |
| JP | 2004144498 | 5/2004 |
| JP | 2004233066 | 8/2004 |
| JP | 2006020797 | 2/2006 |
| JP | 2008096366 | 4/2008 |
| JP | 2009222617 | 10/2009 |
| RU | 2110855 | 5/1998 |
| RU | 2110856 | 5/1998 |
| RU | 2113022 | 6/1998 |
| RU | 2200987 | 3/2003 |
| RU | 2307410 | 9/2007 |
| WO | 1993/16477 | 8/1993 |
| WO | 98/11558 | 3/1998 |
| WO | WO 2003/001534 | 1/2003 |
| WO | 2004/036595 | 4/2004 |
| WO | WO 2006/088516 | 8/2006 |
| WO | WO 2006/096505 | 9/2006 |
| WO | WO 2007/055615 | 5/2007 |
| WO | WO 2012/028900 | 3/2012 |

(56) References Cited

FOREIGN PATENT DOCUMENTS

| WO | 2012066368 A1 | 5/2012 |
|---|---|---|
| WO | WO 2012/065249 | 5/2012 |
| WO | WO 2012/066367 | 5/2012 |

OTHER PUBLICATIONS

Prodea, "Void reactivity reduction in CANDU reactors using burnable absorbers and advanced fuel designs", UPB Scientific Bulletin, Series C: Electrical Engineering 72.1: 145-152, Politechnica University of Bucharest (Jan. 1, 2010). (Year: 2010).*
Tellier, "Burnup dependence of coolant void reactivity for ACR-1000 cell", International Conference on Reactor Physics, Nuclear Power: A Sustainable Resource, Sep. 2008, pp. 1-7. (Year: 2008).*
Choi, "Physics Study on Direct Use of Spent Pressurized Water Reactor Fuel in CANDU (DUPIC)", Nuclear Science and Engineering, 126:1, 80-93 (1997). (Year: 1997).*
World Nuclear News, "Chinese Candu reactor trials uranium reuse", Mar. 24, 2010. (Year: 2010).*
Mian, "Fissile Materials in South Asia and the Implications of the U.S.—India Nuclear Deal", Science & Global Security, 14:2-3, (2006) 117-143. (Year: 2006).*
Kim, "A Lattice-based Monte Carlo Evaluation of Canada Deuterium Uranium-6 Safety Parameters", Nuclear Engineering and Technology (2016) 1-8. (Year: 2016).*
Horhoianu, "Technical feasibility of the use of RU-43 fuel in CANDU-6 reactors of the Cernavoda NPP", No. IAEA-TECDOC-CD—1630, 2009. (Year: 2009).*
Mian, "Fissile Materials in South Asia and the Implications of the U.S.—India Nuclear Deal", Science & Global Security, 14:2-3, 117-143, 2006. (Year: 2006).*
Moran, "Unresolved-issues concerning the final disposal of nuclear material discards", No. K/NSP—165, Martin Marietta Energy Systems, 1994. (Year: 1994).*
Tumini, "Study of a TANDEM fuel cycle between a Brazilian PWR (Angra-I) and an Argentinian CANDU (Embalse)", Annals of Nuclear Energy, vol. 22, No. 1, pp. 1-10, (1995). (Year: 1995).*
Recent Advances in Thorium Fuel Cycles for CANDU Reactors, P.G. Boczar et.al, <<Thorium fuel—cycle studies for CANDU reactors >>, vol. 3, Issue 3, pp. 104-119 (2002).
English Translation of Second Chinese Office Action for Application 201080071078.2 dated Dec. 28, 2015 (8 pages).
English Translation of Second Chinese Office Action for Application 201180064587.7 dated Dec. 28, 2015 (6 pages).
English Translation of Second Chinese Office Action for Application CN201080068932.X dated Dec. 7, 2015 (13 pages).
English Translation of Second Chinese Office Action for Application 201080071079.7 dated Dec. 14, 2015 (10 pages).
Notification of the First Office Action from the Intellectual Property Office of the People's Republic of China for Application No. 201080068932.X dated Feb. 17, 2015 (21 pages).
Boczar et al., "Thorium fuel-cycle studies for CANDU reactors," <<thorium fuel utilization: options and trends>>, vol. 3, Issue 3, pp. 25-41.
Thompson, C. A., "Nuclear energy research initiative: Thorium fuel cycle projects," <<thorium fuel utilization: options and trends>> vol. 3, Issue 3, pp. 97-103.
Pinheiro, R. Brant, "Brazilian Experience on Thorium Fuel Cycle Investigations," <<thorium fuel utilization: options and treads>>, vol. 3, Issue 3, pp. 13-21.
Boczar, Peter, "CANDU Fuel Cycle Vision," Nuclear Power Engineering, vol. 20, No. 6, Dec. 1999 (7 pages).
English translation of Boczar, Peter, "CANDU Fuel Cycle Vision," Nuclear Power Engineering, vol. 20, No. 6, Dec. 1999 (13 pages).
English translation of RU2200987 Feb. 7, 2001 (9 pages).
Mingjun, M. et al., "Feasibility Analysis and Demonstration Project of Using Pressurized Water Reactor Recycled Uranium as the Fuel of Heavy Water Reactor," Collection of Papers of Seminar on Small Scale "Recycling Economy" pp. 30-37.
ORNL/TM-2007/207 Analysis of the Reuse of Uranium Recovered from the Reprocessing of Commercial LWR Spent Fuel. Jan. 2009.
Boczar et al., "Thorium fuel utilization—Options and Trends," 2002, IAEA-TECDOC-1319 pp. 29-30.
Boubcher et al., Physics Caracteristics of a Candu 6 Fuelled With Thorium Fuel (2009), TU2009, 4 pages.
Boczar et al., A Fresh Look at Thorium Fuel Cycles in Candu Reactors, Presented at 11th Pacific Basin Nuclear Conference, Banff Canada (1998), 13 pages.
Boczar et al., Qualifications of Reactor Physics Toolset for a Throrium-Fuelled Candu Reactor (2010), Paper No. ICONE 18-29763, 6 pages.
World Nuclear Association, "Processing of Used Nuclear Fuel", <http://www.world-nuclear.org/info/Nuclear-Fuel-Cycle/Fuel-Recycling/Processing-of-Used-Nuclear-Fuel/> webpage available as early as May 2012.
AECL, Low-Enriched and Recovered Uranium in CANDU Reactors (2008) AECL Mar. 2008 PP&I Graphics 1430, 2 pages.
IAEA, Management of Reprocessed Uranium Current Status and Future Prospects (2007), IAEA-TECDOC-1529, 108 pages.
Zhonsheng et al., Candu Fuel-Cycle Vision, China Journal of Nuclear Engineering (1999), vol. 20, No. 6, 18 pages.
Wikipedia, The manufacturing and quality plan of NUE for HWR, Apendix 2 and 3, <http://en.wikipedia.org/wiki/Reprocessed_uranium> webpage available as early as Sep. 13, 2006.
International Search Report and Written Opinion for Application No. PCT/IB2010/002915 dated Aug. 8, 2011 (8 pages).
International Preliminary Report on Patentability for Application No. PCT/IB2010/002915 dated May 6, 2013 (5 pages).
Roh et al., Nuclear Engineering and Design, Improvement of power coefficient by using burnable poison in the CANDU reactor (2011), 241, pp. 1565-1578.
International Preliminary Report on Patentability for Application No. PCT/IB2010/002914 dated Apr. 11, 2013 (18 pages).
Yu, An Overview of the ACR Design (2002) 48 pages.
International Search Report and Written Opinion for Application No. PCT/IB2010/002914 dated Aug. 15, 2011 (11 pages).
International Preliminary Report on Patentability for Application No. PCT/CA2011/001262 dated Apr. 11, 2013 (7 pages).
International Search Report and Written Opinion for Application No. PCT/CA2011/001262 dated Mar. 1, 2012 (9 pages).
Margeanu et al., Thorium-based fuels preliminary lattice cell studies for CANDU reactors (2009) 7th conference on nuclear and particle physics, Nov. 11-15, 2009, 11 pages.
International Search Report and Written Opinion for Application No. PCT/IB2010/002501 dated Jun. 2, 2011 (7 pages).
International Preliminary Report on Patentability for Application No. PCT/IB2010/002501 dated Mar. 5, 2013 (6 pages).
Co-pending U.S. Appl. No. 13/885,582, filed May 15, 2013.
Co-pending U.S. Appl. No. 13/885,592, filed May 15, 2013.
Co-pending U.S. Appl. No. 13/819,999, filed Apr. 12, 2013.
IAEA TECHDOC 1630 "Use of Reprocessed Uranium," Vienna Aug. 2007.
Office Action from the United States Patent and Trademark Office for U.S. Appl. No. 13/885,582 dated Feb. 4, 2016 (40 pages).
Office Action from the United States Patent and Trademark Office for U.S. Appl. No. 13/819,999 dated Feb. 4, 2016 (46 pages).
Office Action from the United States Patent and Trademark Office for U.S. Appl. No. 13/885,592 dated Feb. 16, 2016 (10 pages).
English translation of Korean Patent Office Action for Application No. 10-2013-7015370 dated Sep. 1, 2016 (3 pages).
English translation of Korean Patent Office Action for Application No. 10-2013-7015369 dated Sep. 1, 2016 (3 pages).
Horhoianu et al., "Technical feasibility of using RU-43 fuel in the CANDU-6 reactors of the Cernavoda NPP," (Jan. 15, 2008) 8 pages.
Office Action from the United States Patent and Trademark Office for U.S. Appl. No. 13/819,999 dated Aug. 1, 2016 (44 pages).
Zhongsheng, et al., "Advanced CANDU Fuel Cycle Vision," Nuclear Power Engineering, vol. 20, Issue 6, Dec. 1999 (7 pages).
English translation of First Office Action from the Intellectual Property Office of the People's Republic of China for Application No. 201080071078.2 dated Apr. 17, 2015 (9 pages).

(56) References Cited

OTHER PUBLICATIONS

Sweden Patent Office Action for Application No. 1350236-4 dated Apr. 29, 2014 (9 pages including translation).
International Astomic Energy Agency, "Thorium fuel utilization: Options and trends" Proceedings of three IAEA meetings held in Vienna in 1997, 1998 and 1999, printed 2002 (1-376).
Office Action from the United States Patent and Trademark Office for U.S. Appl. No. 13/885,582 dated Aug. 2, 2016 (24 pages).
Fuel Temperature Coefficient—Doppler Coefficient, Nuclear-Power. net, available at: http://www.nuclear-power.net/nuclear-power/reactor-physics/nuclear-fission-chain-reaction/reactivity-coefficients-reactivity-feedbacks/fuel-temperature-coefficient-doppler-coefficient/.
Office Action from the United States Patent and Trademark Office for U.S. Appl. No. 13/885,592 dated Jul. 11, 2016 (14 pages).
English Translation of Korean Office Action for Application No. 10-2013-7015371 dated Jul. 19, 2016 (4 pages).
Final Office Action from the Korean Patent and Trademark Office for Application No. 10-2013-7008564 dated Dec. 30, 2016 (5 pages).
Office Action from the United States Patent and Trademark Office for U.S. Appl. No. 13/885,592 dated Jan. 5, 2017 (13 pages).
Zhongsheng et al., "Advanced CANDU fuel cycle vision"—China Journal of Nuclear Engineering, vol. 20, No. 6, Oct. 30, 1999 (Oct. 30, 1999) https://canteach.candu.org/Content%20Libray/20054415.pdf.
Chang-Joon Jeong et al., "Compatibility Analysis on Existing Reactivity Devices in CANDU 6 Reactors for DUPIC Fuel Cycle"—Nucklear Science and Engineering, vol. 134, p. 265-280, Mar. 2000 http://www.ans.org/pubs/journals/nse/a_2115.
Canadian Office Action for Application No. 2,817,884 dated Feb. 14, 2017 (5 pages).
Canadian Office Action for Application No. 2,817,767 dated Feb. 6, 2017 (4 pages).
Canadian Office Action for Application No. 2,820,125 dated Feb. 15, 2017 (4 pages).
Passing Preliminary Report from the People's Republic of China for Application No. 201610821878.0 dated Jan. 23, 2017 (1 page).
Passing Preliminary Report from the People's Republic of China for Application No. 201610913807.3 dated Jan. 19, 2017 (2 pages).
Final Office Action from the Korean Patent and Trademark Office for Application No. 10-2013-7015371 dated Feb. 1, 2017 (9 pages).
Office Action from the United States Patent and Trademark Office for U.S. Appl. No. 13/819,999 dated Feb. 28, 2017 (14 pages).
English translation of first Korean Office Action dated Sep. 1, 2016 (1 page).
Del Cul et al., "Analysis of the Reuse of Uranium Recovered from the Reprocessing of Commercial LWR Spent Fuel," ORNL/TM-2007/207 (Jan. 2009), 62 pages.
Horhoianu et al., "Technical feasiibility of using RU-43 fuel in the CANDU-6 reactors of the Cernavoda NPP." (Jan. 15, 2008), 8 pages.
Boczar, P. G. et al., "Thorium fuel-cycle studies for CANDU reactors," Proceedings of an IAEA International Conference, Vienna, AT, dated Jan. 1, 1998 (pp. 25-41).

Extended European Search Report for Application No. EP10 85 6635, dated Nov. 30, 2016 (7 pages).
Canadian Office Action for Application No. 2,810,133 dated Sep. 21, 2016 (4 pages).
Whitlock, Jeremy J., "The Evolution of Candu Fuel Cycles and Their Potential Contribution to World Peace," International Youth Nuclear Congress, 2000—iaea.org, retrieved from the Internet: http://www.iaea.org/inis/collection/NCLCollectionStore/_Public/33/011/33011302.pdf.
Sahin et al., "Candu reactor as minor actinide/thorium burner with uniform power density in the fuel bundle"—Annals of Nuclear Energy—Apr. 2008, DOI: 10.1016/j.anucene.2007.08.003, retrieved from the internet.
Argentinian Examination Report dated May 16, 2018, issued in Argentinian Application No. 20130101777.
Intellectual Property Office of the People's Republic of China First Office Action Notice dated Aug. 14, 2017, issued in Chinese Application No. 2016108218780.0.
Intellectual Property Office of the People's Republic of China Decision of Rejection dated Jun. 25, 2018, issued in Chinese Application No. 201610821878.0.
Romanian State Office for Inventions and Trademarks Office Action dated Jul. 24, 2017, issued in Romanian Application No. 201300362.
Canadian Intellectual Property Office Examiner's Report dated Jan. 23, 2018, issued in Canadian Application No. 2,817,884.
Korean Intellectual Property Office Office Action dated Apr. 3, 2017, issued in Korean Application No. 10-2013-7015369.
Korean Intellectual Property Office Office Action dated Oct. 29, 2017, issued in Korean Application No. 10-2017-7017345.
Hatcher, S.R., "Prospects for Future CANDU Fuel Cycles", AECL-6334, Atomic Energy of Canada Limited, Public Affairs Office, Feb. 1979.
Chinese Notification of Re-Examination issued in Chinese Application No. 201610821878.0, dated May 28, 2019.
Korean Office Action issued in Korean Application No. 10-2017-7017345, dated May 31, 2019.
Canadian Office Action issued in Canadian Application No. 2,817,884, dated Dec. 19, 2018.
Choi et al., "Physics Study on Direct Use of Spent Pressurized Water Reactor Fuel in CANDU (DUPIC)", Nuclear Science and Engineering, vol. 126, pp. 80-93, 1997.
"Chinese CANDU Reactor Trials Uranium Reuse", World Nuclear News, Mar. 24, 2010. www.world-nuclear-news.org/ENF-Chinese_reactor_trials_Candu_fuel_reuse-2403101.html.
Introduction to Nuclear Reaction Kinematics, "Module 12—Reactivity Effects due to Temperature Changes and Coolant Voiding", pp. 1-29, 1997.
Korean Office Action issued in Korean Application No. 10-2019-7035442, dated Mar. 13, 2020.
Fan et al., "Safety Assessment on Nue Fuel Bundles for Demonstration Irradiation in a CANDU Reactor", 11th International Conference on CANDU Fuel, Oct. 17 to 20, 2010.

* cited by examiner

NUCLEAR FUEL CONTAINING RECYCLED AND DEPLETED URANIUM, AND NUCLEAR FUEL BUNDLE AND NUCLEAR REACTOR COMPRISING SAME

BACKGROUND

Nuclear reactors generate energy from a nuclear chain reaction (i.e., nuclear fission) in which a free neutron is absorbed by the nucleus of a fissile atom in a nuclear fuel, such as Uranium-235 ($^{235}$U). When the free neutron is absorbed, the fissile atom splits into lighter atoms, and releases more free neutrons to be absorbed by other fissile atoms, resulting in a nuclear chain reaction, as is well understood in the art. Thermal energy released from the nuclear chain reaction is converted into electrical energy through a number of other processes also well known to those skilled in the art.

The advent of nuclear power reactors adapted to burn nuclear fuel having low fissile content levels (e.g., as low as that of natural uranium) has generated many new sources of burnable nuclear fuel. These sources include waste or recycled uranium from other reactors. This is not only attractive from a cost savings standpoint, but also based upon the ability to essentially recycle spent uranium back into the fuel cycle. Recycling spent nuclear fuel stands in stark contrast to disposal in valuable and limited nuclear waste containment facilities.

For these and other reasons nuclear fuel and nuclear fuel processing technologies that support the practices of recycling nuclear fuel and burning such fuel in nuclear reactors continue to be welcome additions to the art.

SUMMARY

In some embodiments of the present invention, a fuel for a nuclear reactor is provided, and comprises a first fuel component of recycled uranium; and a second fuel component of depleted uranium blended with the first fuel component, wherein the blended first and second fuel components have a fissile content of less than 1.2 wt % of $^{235}$U.

Some embodiments of the present invention provide a fuel for a nuclear reactor, wherein the fuel comprises a first fuel component of recycled uranium; and a second fuel component of natural uranium blended with the first fuel component, wherein the blended first and second fuel components have a fissile content of less than 1.2 wt % of $^{235}$U.

Other aspects of the present invention will become apparent by consideration of the detailed description and accompanying drawings.

DETAILED DESCRIPTION

Before any embodiments of the invention are explained in detail, it is to be understood that the invention is not limited in its application to the details of embodiment and the arrangement of components set forth in the following description or illustrated in the accompanying drawings. The invention is capable of other embodiments and of being practiced or of being carried out in various ways.

A number of nuclear fuels according to various embodiments of the present invention are disclosed herein. These fuels can be used in a variety of nuclear reactors, and are described herein with reference to pressurized heavy water reactors. Such reactors can have, for example, pressurized horizontal or vertical tubes within which the fuel is positioned. An example of such a reactor is a Canadian Deuterium Uranium (CANDU) nuclear reactor. Other types of reactors can have un-pressurized horizontal or vertical tubes with holes in them.

Pressurized heavy water nuclear reactors are only one type of nuclear reactor in which various nuclear fuels of the present invention can be burned. Accordingly, such reactors are described herein by way of example only, it being understood that the various fuels of the present invention can be burned in other types of nuclear reactors.

Similarly, the various fuels of the present invention described herein can be positioned in any form within a nuclear reactor for being burned. By way of example only, the fuel can be loaded into tubes or can be contained in other elongated forms (each of which are commonly called "pins" or "elements"). In the case of fuel contained within tubes, the tubes can be made of or include zirconium, a zirconium alloy, or another suitable material or combination of materials that in some cases is characterized by low neutron absorption.

Together, a plurality of elements can define a fuel bundle within the nuclear reactor. The elements of each bundle can extend parallel to one another in the bundle. If the reactor includes a plurality of fuel bundles, the bundles can be placed end-to-end inside a pressure tube. In other types of reactors, the fuel bundles can be arranged in other manners as desired.

When the reactor is in operation, a heavy water coolant flows over the fuel bundles to cool the fuel elements and remove heat from the fission process. The nuclear fuels of the present invention are also applicable to pressure tube reactors with different combinations of liquids/gasses in their heat transport and moderator systems. In any case, coolant absorbing heat from the nuclear fuel can transfer the heat to downstream equipment for generating power (e.g., electrical energy).

Canadian Patent Application No. 2,174,983, filed on Apr. 25, 1996, describes examples of fuel bundles for a nuclear reactor that can comprise any of the nuclear fuels described herein. The contents of Canadian Patent Application No. 2,174,983 are incorporated herein by reference.

The various nuclear fuels of the present invention can be used (e.g., blended) in conjunction within one or more other materials. Whether used alone or in combination with other materials, the nuclear fuel can be in pellet form, powder form, or in another suitable form or combination of forms. In some embodiments, fuels of the present invention take the form of a rod, such as a rod of the fuel pressed into a desired form, a rod of the fuel contained within a matrix of other material, and the like. Also, fuel elements made of the fuels according to the present invention can include a combination of tubes and rods and/or other types of elements.

As described in greater detail below, fuels according to various embodiments of the present invention can include various combinations of nuclear fuels, such as depleted uranium (DU), natural uranium (NU), and reprocessed or recycled uranium (RU). As used herein and in the appended claims, references to "percentage" of constituent components of material included in nuclear fuel refers to percentage weight, unless specified otherwise. Also, as defined herein, DU has a fissile content of approximately 0.2 wt % to approximately 0.5 wt % of $^{235}$U (including approximately 0.2 wt % and approximately 0.5 wt %), NU has a fissile content of approximately 0.71 wt % of $^{235}$U, and RU has a fissile content of approximately 0.72 wt % to approximately 1.2 wt % of $^{235}$U (including approximately 0.72 wt % and approximately 1.2 wt %).

Recycled Uranium

Reprocessed or recycled uranium (RU) is manufactured from spent fuel created from nuclear power production using light water reactors (LWRs). A fraction of the spent fuel is made up of uranium. Therefore, chemical reprocessing of spent fuel leaves behind separated uranium, which is referred to in the industry as reprocessed or recycled uranium. Natural Uranium (NU) contains only the three isotopes $^{234}$U, $^{235}$U, and $^{238}$U. However, after irradiation in a LWR and cooling, the resulting RU has an isotopic composition different from natural uranium. In particular, RU includes four additional types of uranium isotopes that are not present in natural uranium: $^{236}$U and $^{232}$U, $^{233}$U, and $^{237}$U (generally considered impurities). Accordingly, the presence of these four additional isotopes can be considered a signature for RU.

It should also be understood that the isotopic composition of RU is dependent on many factors, such as the initial $^{235}$U content in the fuel prior to irradiation (i.e., fresh fuel), the origin(s) of the fuel, the type of reactor in which the fuel was burned, the irradiation history of the fuel in the reactor (e.g., including burnup), and the cooling and storage periods of the fuel after irradiation. For example, most irradiated fuels are cooled for at least five years in specially engineered ponds to ensure radiological safety. However, the cooling period can be extended to 10 or 15 years or longer.

RU often includes chemical impurities (e.g., Gadolinum) caused by fuel cladding, fuel doping, and separation and purification methods used on the RU. These chemical impurities can include very small quantities of transuranic isotopes, such as Plutonium-238 ($^{238}$Pu), $^{239}$Pu, $^{240}$Pu, 241Pu, $^{242}$Pu, Neptunium-237 ($^{237}$Np), Americium-241 ($^{241}$Am), Curium-242 ($^{242}$Cm) and fission products, such as Zirconium-95/Niobium-95 ($^{95}$Zr/$^{95}$Nb), Ruthenium-103 ($^{103}$Ru), $^{106}$Ru, Cesium-134 ($^{134}$Cs), $^{137}$Cs, and Technetium-99 ($^{99}$Tc). Other impurities often present in RU include: Aluminum (Al), Boron (B), Cadmium (Cd), Calcium (Ca), Carbon (C), Chlorine (Cl), Chromium (Cr), Copper (Cu), Dysprosium (Dy), Flourine (F), Iron (Fe), Magnesium (Mg), Manganese (Mn), Molybdenum (Mo), Nickel (Ni), Nitrogen (N), Phosphorous (P), Potassium (K), Silicon (Si), Sodium (Na), Sulphur (S), and Thorium (Th).

Depleted Uranium

As stated above, depleted uranium (DU) has a fissile content of approximately 0.2 wt % to approximately 0.5 wt % of $^{235}$U (including approximately 0.2 wt % and approximately 0.5 wt %). DU is uranium primarily composed of the isotopes Uranium-238 ($^{238}$U) and Uranium-235 ($^{235}$U). In comparison, natural uranium (NU) is approximately 99.28 wt % $^{238}$U, approximately 0.71 wt % $^{235}$U, and approximately 0.0054 wt % percent $^{234}$U. DU is a byproduct of uranium enrichment, and generally contains less than one third as much $^{235}$U and $^{234}$U as natural uranium. DU also includes various impurities, such as: Aluminum (Al), Boron (B), Cadmium (Cd), Calcium (Ca), Carbon (C), Chlorine (Cl), Chromium (Cr), Copper (Cu), Dysprosium (Dy), Flourine (F), Gadolinium (Gd), Iron (Fe), Magnesium (Mg), Manganese (Mn), Molybdenum (Mo), Nickel (Ni), Nitrogen (N), Phosphorous (P), Potassium (K), Silicon (Si), Sodium (Na), Sulphur (S), and Thorium (Th).

Blended Fuel

It will be appreciated that in many applications, the uranium content of many nuclear fuels is too high or too low to enable such fuels to be burned in a number of nuclear reactors. Similarly, the constituent components of RU ($^{234}$U, $^{235}$U, $^{236}$U, and $^{238}$U) and the above-described impurities ($^{232}$U, $^{233}$U, and $^{237}$U) typically found in RU can prevent RU from being a viable fuel in many reactors. However, the inventors have discovered that by blending RU with DU, the fissile content of $^{235}$U in the resulting nuclear fuel can be brought into a range that is acceptable for being burned as fresh fuel in many nuclear reactors, including without limitation pressurized heavy water nuclear reactors (e.g., pressurized heavy water nuclear reactors having horizontal fuel tubes, such as those in CANDU reactors). Similar results can be obtained by blending RU with NU to reduce the fissile content of $^{235}$U in the resulting nuclear fuel to an acceptable range for being burned as fresh fuel.

Whether blended with DU or NU, RU can be blended using any method known in the art, such as but not limited to using an acid solution or dry mixing.

In some embodiments, the nuclear reactor fuel of the present invention includes a first fuel component of RU and a second fuel component of DU that have been blended together to have a combined fissile content of less than 1.2 wt % of $^{235}$U. In such fuels, the RU can have a fissile content of approximately 0.72 wt % of $^{235}$U to approximately 1.2 wt % of $^{235}$U. In other embodiments, the RU in such fuels can have a fissile content of approximately 0.8 wt % of $^{235}$U to approximately 1.1 wt % of $^{235}$U. In other embodiments, the RU in such fuels can have a fissile content of approximately 0.9 wt % of $^{235}$U to approximately 1.0 wt % of $^{235}$U. In still other embodiments, the RU in such fuels can have a fissile content of approximately 0.9 wt % of $^{235}$U. In each of these embodiments, the DU of such fuels can have a fissile content of approximately 0.2 wt % of $^{235}$U to approximately 0.5 wt % of $^{235}$U.

Accordingly, by blending lower $^{235}$U fissile content DU with the higher $^{235}$U fissile content RU, the resulting blended RU/DU nuclear fuel can have a fissile content of less than 1.0 wt % of $^{235}$U in some embodiments. In other embodiments, the resulting blended RU/DU nuclear fuel can have a fissile content of less than 0.8 wt % of $^{235}$U. In other embodiments, the resulting RU/DU nuclear fuel can have a fissile content of less than 0.72 wt % of $^{235}$U. In still other embodiments, the resulting RU/DU nuclear fuel can have a fissile content of approximately 0.71 wt % of $^{235}$U, thereby resulting in a natural uranium equivalent fuel generated by blending RU and DU.

In some embodiments, the nuclear reactor fuel of the present invention includes a first fuel component of RU and a second fuel component of NU that have been blended together to have a combined fissile content of less than 1.2 wt % of $^{235}$U. In such fuels, the RU can have a fissile content of approximately 0.72 wt % of $^{235}$U to approximately 1.2 wt % of $^{235}$U. In other embodiments, the RU in such fuels can have a fissile content of approximately 0.8 wt % of $^{235}$U to approximately 1.1 wt % of $^{235}$U. In other embodiments, the RU in such fuels can have a fissile content of approximately 0.9 wt % of $^{235}$U to approximately 1.0 wt % of $^{235}$U. In still other embodiments, the RU in such fuels can have a fissile content of approximately 0.9 wt % of $^{235}$U.

Accordingly, by blending lower $^{235}$U fissile content NU with the higher $^{235}$U fissile content RU, the resulting blended RU/NU nuclear fuel can have a fissile content of less than 1.0 wt % of $^{235}$U in some embodiments. In other embodiments, the resulting blended RU/NU nuclear fuel can have a fissile content of less than 0.8 wt % of $^{235}$U. In other embodiments, the resulting RU/NU nuclear fuel can have a fissile content of less than 0.72 wt % of $^{235}$U. In still other embodiments, the resulting RU/NU nuclear fuel can have a fissile content of approximately 0.71 wt % of $^{235}$U, thereby resulting in a natural uranium equivalent fuel generated by blending RU and NU.

In some embodiments, RU is blended with both DU and NU to produce fuels having the same $^{235}$U fissile contents or content ranges described above in connection with blended RU/DU and blended RU/NU nuclear fuels. In such cases, the $^{235}$U fissile contents and content ranges of RU, and the $^{235}$U fissile contents and content ranges of DU can be the same as those described above.

The nuclear fuels according to the various embodiments of the present invention can include a burnable poison (BP). For example, any of the nuclear fuels described herein can include a blend of RU and DU with a burnable poison (BP), or a blend of RU and NU with a burnable poison (BP). The burnable poison can be blended with the various RU/DU blends, RU/NU blends, and RU/DU/NU blends described herein.

In heavy water cooled reactors, the rate of neutron multiplication increases when coolant voiding occurs. Coolant voiding occurs, for example, when coolant starts to boil. Coolant void reactivity is a measure of the ability of a reactor to multiply neutrons. This phenomenon is due to positive coolant void reactivity, and can occur in all reactors for different scenarios. The present invention can provide a significant reduction in coolant void reactivity, and can also provide a negative fuel temperature coefficient and/or a negative power coefficient.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, in various embodiments described and/or illustrated herein, RU and DU blends are further blended with different types of nuclear fuel or other materials to produce nuclear fuels having desired fissile contents. For example, the RU and DU can be blended (alone or as a RU/DU blend) with thorium oxide (ThO$_2$), slightly enriched uranium (SEU), and low enriched uranium (LEU). As defined herein, SEU has a fissile content of approximately 0.9 wt % to approximately 3 wt % of $^{235}$U (including approximately 0.9 wt % and approximately 3 wt %), and LEU has a fissile content of approximately 3 wt % to approximately 20 wt % of $^{235}$U (including approximately 3 wt % and approximately 20 wt %).

What is claimed is:

1. A fuel for a heavy water nuclear reactor, the fuel comprising:
   a first fuel component of recycled uranium having a fissile content greater than 0 wt %; and
   a second fuel component of depleted uranium having a fissile content greater than 0 wt %, the second fuel component blended with the first fuel component,
   wherein the fuel has a fissile content in a range of greater than 0.72 wt % of $^{235}$U and less than 1.2 wt % of $^{235}$U,
   wherein the fuel, when burned by the nuclear reactor, has a negative fuel temperature coefficient,
   wherein the fuel is substantially free of post processed plutonium,
   wherein the recycled uranium and depleted uranium comprise constituent components including 234U, 235U, and 236U, and 238U, and chemical impurities;
   wherein the first fuel component and second fuel component are blended such that the fissile content of 235U of the fuel is in the range based on the amounts of constituent components and chemical impurities;
   wherein the fuel is configured to be inserted into the heavy water nuclear reactor and burned as a fresh fuel when the heavy water nuclear reactor is operating; and
   wherein the fuel is configured to be positioned in the heavy water nuclear reactor to maintain a negative fuel temperature coefficient for the heavy water reactor when burned.

2. The fuel of claim 1, wherein the recycled uranium has a fissile content of approximately 0.72 wt % of $^{235}$U to less than 1.2 wt % of $^{235}$U.

3. The fuel of claim 2, wherein the recycled uranium has a fissile content of approximately 0.8 wt % of $^{235}$U to approximately 1.1 wt % of $^{235}$U.

4. The fuel of claim 3, wherein the recycled uranium has a $^{235}$U fissile content of approximately 0.9 wt % of U to approximately 1.0 wt % of $^{235}$U.

5. The fuel of claim 4, wherein the recycled uranium has a fissile content of approximately 0.9 wt % of $^{235}$U.

6. The fuel of claim 1, wherein the depleted uranium has a fissile content of approximately 0.2 wt % of $^{235}$U to approximately 0.5 wt % of $^{235}$U.

7. The fuel of claim 1, wherein the fuel further comprises a burnable poison.

8. The fuel of claim 7, wherein the burnable poison is blended with the first and second fuel components.

9. The fuel of claim 1, wherein the blended first and second fuel components have a fissile content of less than 1.0 wt % of $^{235}$U.

10. The fuel of claim 9, wherein the blended first and second fuel components have a fissile content of less than 0.8 wt % of $^{235}$U.

11. A fuel for a heavy water nuclear reactor, the fuel comprising:
    a first fuel component of recycled uranium having a fissile content greater than 0 wt %; and
    a second fuel component of natural uranium having a fissile content greater than 0 wt %, the second fuel component blended with the first fuel component,
    wherein the fuel has a fissile content in a range of greater than 0.72 wt % of $^{235}$U and less than 1.2 wt % of 235U,
    wherein the fuel when burned by the nuclear reactor, has a negative fuel temperature coefficient,
    wherein the fuel is substantially free of post processed plutonium,
    wherein the recycled uranium and depleted uranium comprise constituent components including 234U, 235U, and 236U, and 238U, and chemical impurities;
    wherein the first fuel component and second fuel component are blended such that the fissile content of 235U of the fuel is in the range based on the amounts of constituent components and chemical impurities;
    wherein the fuel is configured to be inserted into the heavy water nuclear reactor and burned as a fresh fuel when the heavy water nuclear reactor is operating; and
    wherein the fuel is configured to be positioned in the heavy water nuclear reactor to maintain a negative fuel temperature coefficient for the heavy water reactor when burned.

12. The fuel of claim 11, wherein the recycled uranium has a fissile content of approximately 0.72 wt % of $^{235}$U to less than 1.2 wt % of $^{235}$U.

13. The fuel of claim 12, wherein the recycled uranium has a fissile content of approximately 0.8 wt % of $^{235}$U to approximately 1.1 wt % of $^{235}$U.

14. The fuel of claim 13, wherein the recycled uranium has a fissile content of approximately 0.9 wt % of $^{235}$U to approximately 1.0 wt % of $^{235}$U.

15. The fuel of claim 14, wherein the recycled uranium has a fissile content of approximately 0.9 wt % of $^{235}$U.

16. The fuel of claim 11, wherein the fuel further comprises a burnable poison.

17. The fuel of claim 16, wherein the burnable poison is blended with the first and second fuel components.

18. The fuel of claim 11, further comprising a third fuel component of depleted uranium blended with the first and second fuel components.

19. The fuel of claim 11, wherein the blended first and second fuel components have a fissile content of less than 1.0 wt % of $^{235}$U.

20. The fuel claim 19, wherein the blended first and second fuel components have a fissile content of less than 0.8 wt % of $^{235}$U.

21. The fuel of claim 18, wherein the blended first, second, and third fuel components have a fissile content of less than 1.2 wt % of $^{235}$U.

22. Use of a fuel in a heavy water nuclear reactor to maintain a negative fuel temperature coefficient of the reactor, the fuel comprising:
   a first fuel component of recycled uranium having a fissile content greater than 0 wt %; and
   a second fuel component of depleted uranium having a fissile content greater than 0 wt %, the second fuel component blended with the first fuel component,
   wherein the fuel has a fissile content in a range of greater than 0.72 wt % and less than 1.2 wt % of 235U, wherein the heavy water nuclear reactor is refueled with the fuel to maintain the negative fuel temperature coefficient of the reactor,
   wherein the fuel, when burned by the nuclear reactor, has a negative fuel temperature coefficient, wherein the fuel is substantially free of post processed plutonium,
   wherein the recycled uranium and depleted uranium comprise constituent components including 234U, 235U, and 236U, and 238U, and chemical impurities;
   wherein the first fuel component and second fuel component are blended such that the fissile content of 235U of the fuel is in the range based on the amounts of constituent components and chemical impurities;
   wherein the fuel is configured to be inserted into the heavy water nuclear reactor and burned as a fresh fuel when the heavy water nuclear reactor is operating; and
   wherein the fuel is configured to be positioned in the heavy water nuclear reactor to maintain a negative fuel temperature coefficient for the heavy water reactor when burned.

23. The use of the fuel of claim 22, wherein the recycled uranium has a fissile content of approximately 0.8 wt % of $^{235}$U to approximately 1.1 wt % of $^{235}$U.

* * * * *